United States Patent [19]

Vanderpool

[11] 4,199,617
[45] Apr. 22, 1980

[54] COATED PHOSPHORS AND ARTICLES EMPLOYING SAME

[75] Inventor: Clarence D. Vanderpool, Towanda, Pa.

[73] Assignee: GTE Sylvania Incorporated, Stamford, Conn.

[21] Appl. No.: 966,980

[22] Filed: Dec. 6, 1978

Related U.S. Application Data

[62] Division of Ser. No. 917,825, Jun. 22, 1978.

[51] Int. Cl.² .......................... B32B 5/16; B05D 5/06; B05D 5/12
[52] U.S. Cl. ..................................... 427/64; 427/220; 427/221; 252/301.36; 428/403; 428/407
[58] Field of Search ................. 427/64, 215, 218, 220, 427/221; 252/301.36; 428/407, 403

[56] References Cited

U.S. PATENT DOCUMENTS

| | | | |
|---|---|---|---|
| 3,317,337 | 5/1967 | Saulnier | 427/68 |
| 3,714,490 | 1/1973 | Knell | 427/215 |
| 3,875,449 | 4/1975 | Byler | 313/468 |
| 4,049,845 | 9/1977 | Lozier | 428/407 |

*Primary Examiner*—Michael F. Esposito
*Attorney, Agent, or Firm*—John C. Fox

[57] ABSTRACT

The disposition of an array of color phosphor dots on a color cathode ray tube faceplate by conventional photo deposition techniques is facilitated by first coating the individual phosphor particles with polyvinyl alcohol modified with an amino acid such as glutamic or aspartic acid.

2 Claims, 3 Drawing Figures

COATED PHOSPHORS AND ARTICLES EMPLOYING SAME

CROSS-REFERENCE TO RELATED APPLICATION

This application is a divisional of Ser. No. 917,825, filed June 22, 1978, and assigned to the assignee of the present invention.

BACKGROUND OF THE INVENTION

This invention relates to a coating for phosphors, specifically to a phosphor coating of polyvinyl alcohol, and to such a coating modified with amino acids, and also to articles of manufacture employing the coated phosphors.

Two general methods of preparation of tridot color cathode ray tube screens for color television are wet screening and dusting. In wet screening, slurries of each phosphor (red, blue and green) are mixed separately in solutions of polyvinyl alcohol rendered photosensitive by the addition of a hexavalent chromium salt, for example, ammonium dichromate. Each slurry is uniformly spread on the faceplate of the cathode ray tube by rotation of the faceplate. The layer thus formed is exposed with a pattern of light corresponding to the pattern of dots desired to be formed on the screen. The exposed area becomes insoluble in a "developer," such as water. Therefore, when the screen is washed or "developed," the exposed area remains while the unexposed area is washed away, leaving the desired dot pattern. The procedure is repeated for each color to obtain an array of red, blue and green phosphor dots on the screen. Such dots are usually circular in shape, but could be oblong, or any other desired shape.

In the dusting method, dots of photosensitive material without the phosphors are made by exposing and developing as described above for the wet method. Then the phosphors are deposited on the wet or sticky dots by "dusting."

During preparation of the screen by either method, a number of requirements must be met by the phosphor. The phosphor must (1) be wettable by the photosensitive material, (2) not react with the photosensitive material, (3) form a good adhesive bond with the photosensitive material, and (4) wash out of the unexposed areas. In the dusting procedure, there is the added requirement that the phosphor must flow freely, in order to avoid plugging of the dusting apparatus.

Most commercial phosphors, especially the red, blue and green required for tridot color cathode ray tubes, will not meet the above requirements. In the past, such phosphors have been coated with some inert material in order to modify the surface characteristics of the phosphor to make them usable in the screening process, such as silica and pyrophosphates. $Sr_2P_2O_7$ has been used to improve adherence on the faceplate and to eliminate "haze," the non-purity of color television pictures resulting from either incomplete washing out from the unexposed areas, or cross-contamination of two or more of the phosphors, or both.

An alternate coating for the blue ZnS:Ag phosphor, magnesium aluminum pyrophosphate and silica, is claimed in allowed U.S. patent application Ser. No. 729,905, filed Oct. 6, 1976 now U.S. Pat. No. 4,103,069, and assigned to the present assignee.

However, there is a need for a single coating system which is both compatible with the commonly used dichromate sensitized polyvinyl alcohol photosensitive material and all of the phosphors used in tridot color cathode ray tube screen manufacture. Accordingly, it is felt that such a coating having universal compatibility would be an advance in the art.

SUMMARY OF THE INVENTION

In accordance with the invention, a coating of polyvinyl alcohol is provided for phosphor particles. It has been found that such coating will effectively coat the red, blue and green cathode ray phosphors used in tridot color cathoe ray tube screen manufacture and that such coated phosphors are compatible with the commonly used dichromated polyvinyl alcohol photosensitive material, herein referred to as "photoresist," used in the preparation of such cathode ray tube screens.

In accordance with a preferred embodiment, the addition of an amino acid such as glutamic or aspartic acid to the polyvinyl alcohol prior to formation of the coating results in reduced "haze" caused by residual phosphor particles remaining after development of the exposed photoresist. Accordingly, such coated phosphor particles of polyvinyl alcohol modified with an amino acid form a part of the invention.

Further in accordance with the invention, articles of manufacture are provided including dots of photosensitive matrix material supporting coated phosphor particles, such dots disposed in a desired array or pattern upon a substrate such as a cathode ray tube faceplate.

Further in accordance with the invention, a method is provided for the coating of such phosphor particles wherein the particles are slurried in a polyvinyl alcohol solution in the presence of a polymerization agent in order to promote the formation of polymer coatings around the particles suspended in the slurry.

DETAILED DESCRIPTION OF THE INVENTION

For a better understanding of the present invention, together with other and further objects, advantages and capabilities thereof, reference is made to the following disclosure and appended claims in connection with the above described drawings.

Figure 1:
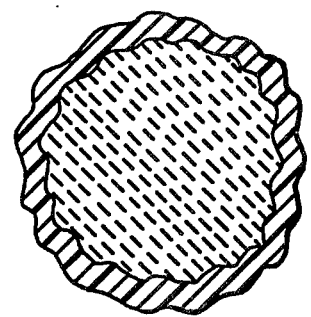
FIG. 1 is a cross section of a phosphor particle surrounded by the polymer coating of the invention.

Referring to FIG. 1, the phosphor particle may be any phosphor material suitable for use in cathode ray tube applications, that is any phosphor which upon excitation by cathode rays emits radiation of a wave length suitable for the envisioned application. It is of course, contemplated in accordance with a preferred embodiment of the invention that the phosphor particles are chosen from the standard red, blue and green phosphors known to be suitable in the fabrication of tridot color cathode ray tube screens for color television. Such phosphor materials are well known and include for example, for the red component, europium activated yttrium oxide and europium activated yttrium oxysulfide. The blue component is usually silver activated zinc sulfide, while the green component is usually copper and aluminum co-activated zinc cadmium sulfide. A process for producing a cadmium free green emitting zinc sulfide is described and claimed in U.S. Pat. No. 4,038,205, issued to H. D. Layman and H. B. Minnier, on July 26, 1977.

As previously stated, it is a particular advantage of the invention that the coating described is compatible with any of the above-mentioned phosphors. Such a coating is polyvinyl alcohol which may be modified with an amino acid such as glutamic acid or aspartic acid, which may be present in the amount of from about 30 to 80 weight percent of the total weight of the coating on the phosphor. Above this range, the presence of the amino acid tends to have the undesirable effect of decomposing and causing a brownish color while below this range, the advantage of reduced haze on the cathode ray tube screen is not appreciable. Based on the above considerations however, it is preferred to maintain the amino acid within the narrower range of about 50 to 75 weight percent of the coating.

In accordance with the invention, a method is provided for coating the phosphor particles wherein the particles are slurried in an aqueous solution of polyvinyl alcohol containing a polymerization agent such as tannic acid. Agitation of the solution at a moderately elevated temperature, for example 80° to 90° C., for a short period of time, for example about ½ to 1 hour, allows the polyvinyl alcohol to polymerize around the phosphor particles. The slurry may then be filtered and the coated particles washed and dried. The dried particles may then be screened, such as through a 200 mesh screen, in order to separate loosely formed agglomerates. It is advantageous to add the phosphor to the aqueous solution prior to the addition of polymerization agent in order to avoid premature thickening of the slurry. If it is desired to add amino acid, however, this should be done prior to the addition of the phosphor particles to the solution to form the slurry.

Figure 2:
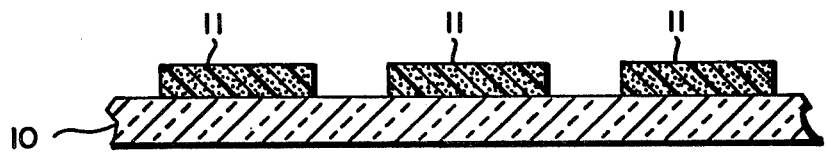
FIG. 2 is a section view of a cathode ray tube faceplate 10 supporting a plurality of dots 11, each dot comprising a plurality of the coated phosphor particles of FIG. 1 supported in a photosensitive matrix.
Figure 3:
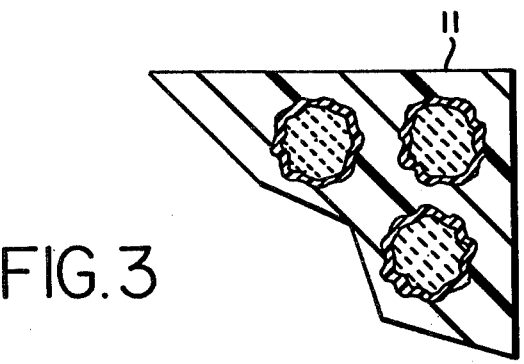
FIG. 3 is an elarged section view of a portion of one of the lands of FIG. 2 showing the coated phosphor particle of FIG. 1 embedded in the photosensitive matrix material.

Referring now to FIG. 2, there is shown an article of manufacture including an array of a plurality of dots of a photosensitive matrix material, such as dichromated polyvinyl alcohol photoresist, supporting coated phosphor particles, the dots in turn supported by a screen substrate such as a cathode ray tube faceplate. As previously described, such dots are preferably formed by exposing an integral photoresist layer selectively with a pattern of light corresponding to the pattern of dot arrays desired to be formed on the faceplate. Subsequently, a developer removes the unexposed portions of the photoresist including the phosphor particles supported therein, and leaves the dots which had been insolubilized to the developer by the light exposure. FIG. 3 is an enlarged section of a small portion of one of the lands showing a phosphor particle of the invention embedded in the photoresist matrix.

EXAMPLE 0.8 Grams of polyvinyl alcohol was dissolved in 800 milliliters of water, with moderate heating and agitation to aid in the dissolution. Then 0.5 grams each of aspartic acid and glutamic acid were added to the solution. 400 Grams of a green zinc cadmium sulfide cathode ray phosphor co-activated by copper aluminum was then slurried into the solution. 1 Gram of tannic acid dissolved in 30 cubic centimeters of water was then added to the slurry, and the slurry was agitated at about 80° to 90° C. for about 30 minutes to allow the polyvinyl alcohol to polymerize around the phosphor particles. The slurry was then filtered and the coated phosphor were washed and dried at about 110° C. After drying, the particles were screened through a 200 mesh screen. Slurries of the screened material and a standard material of the green phosphor having a coating of silica were then formed in the photosensitive dichromated polyvinyl alcohol solution. Ph and viscosity of the slurries were measured, and then layers of the slurries were formed uniformly upon faceplates rotating at the rate of 220 revolutions per minute, for a period of 13 seconds. The plates were given identical light exposures, and developed for the same times with a developer at the same temperature. Dot size as diamter of circular dots, "haze," "curl," screen weight, angle and fracture adherence were measured. Have was measured by determining the relative amount of phosphor in the clear area of the mask visually at 60 to 100x magnification. Curl was measured by visual observation at 60 to 100x of relative sharpness of the dot edges. Fractional adherence was measured by a standard test procedure for obtaining the ratio of light energy which will produce a missing dot divided by the light energy which will produce a "bogey," i.e., largest size, dot. The procedure involves fabricating a screen using a mask having holes continuously decreasing in size in a counter clockwise direction from "bogey," in this case 0.145 inches, from a vertical line through the center of the screen the fractional adherence is proportional to the angle between vertical and a line connecting center with the first missing dot. Results are shown in Table I below. As may be seen, haze was significantly lower for the Example material than for the standard material. Fracture adherence was also lower as were viscosity and screen weight, indicating a more economical use of material.

While there has been shown and described what are at present considered the preferred embodiments of the invention, it will be obvious to those skilled in the art that various changes and modifications may be made therein without departing from the scope of the invention as defined by the appended claims.

TABLE I

|  | Example | Standard |
| --- | --- | --- |
| viscosity (centipoises) | 26 | 31 |
| texture | very smooth, uniform | smooth, uniform |
| pH | 6.21 | 5.73 |
| development time (sec) | 50 | 50 |
| development temp (°F.) | 83 | 83 |
| dot diam (inches) | .0145 | .0135 |
| haze (visual) | 0–5 | 10–15 |
| curl (visual) | fair | fair-good |
| screen weight (mg/cm$^2$) | 3.75 | 4.29 |
| angle (°) | 75 | 70 |
| fractional adherence | .43 | .48 |

What is claimed is:

1. Method for producing a composite article of manufacture comprising phosphor particles and a coating on the surface of the particles, the method comprising:
   (a) forming an aqueous solution of polyvinyl alcohol, and at least one amino acid selected from the group consisting of aspartic acid and glutamic acid, an amount corresponding to from about 30 to 80 weight percent of the polyvinyl alcohol,
   (b) forming a slurry of phosphor particles in the solution, (c) maintaining the slurry while promoting polymerization of polyvinyl alcohol surrounding the particles, and
(d) separating the thus coated particles from the solution.

2. The method of claim 1 wherein polymerization is promoted by (a) adding tannic acid to the slurry in the amount of about 0.10 to 0.5 weight percent, and (b) maintaining the slurry at a temperature of about 80° C. to 90° C. for about ½ to 1 hour.

* * * * *